United States Patent [19]

Schwarz

[11] Patent Number: 5,019,166

[45] Date of Patent: May 28, 1991

[54] THERMAL INK JET COMPOSITIONS

[75] Inventor: William M. Schwarz, Webster, N.Y.

[73] Assignee: Xerox Corporation, Stamford, Conn.

[21] Appl. No.: 370,206

[22] Filed: Jun. 22, 1989

[51] Int. Cl.[5] ............................................. C09D 11/02
[52] U.S. Cl. ......................................... 106/22; 106/20
[58] Field of Search ..................................... 106/22, 20

[56] References Cited

U.S. PATENT DOCUMENTS

| | | | |
|---|---|---|---|
| 3,948,668 | 4/1976 | Hayek et al. | 106/22 |
| 3,985,663 | 10/1976 | Lu et al. | 106/22 |
| 4,139,509 | 2/1979 | Matsunaga et al. | 260/17 R |
| 4,426,226 | 1/1984 | Ohta et al. | 106/22 |
| 4,508,570 | 4/1985 | Fujii et al. | 106/20 |
| 4,554,555 | 11/1985 | Aruga et al. | 106/20 |
| 4,623,689 | 11/1986 | Shintani et al. | 524/457 |
| 4,627,875 | 12/1986 | Kobayashi et al. | 106/22 |
| 4,732,616 | 3/1988 | Kondo et al. | 106/22 |

OTHER PUBLICATIONS

McCutcheon's Detergents & Emulsifiers, 1978 North American Ed., pp. 194 and 204.

*Primary Examiner*—Mark L. Bell
*Assistant Examiner*—Helene Klemanski
*Attorney, Agent, or Firm*—Judith L. Byorick

[57] ABSTRACT

A thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

52 Claims, No Drawings

THERMAL INK JET COMPOSITIONS

BACKGROUND OF THE INVENTION

The present invention relates to ink jet compositions and printing processes. More specifically, the present invention is directed to ink compositions suitable for use in thermal ink jet printing processes. One embodiment of the invention resides in a thermal ink jet ink composition comprising a dye, a liquid medium, and a surfactant such as those selected from the group consisting of polyoxyalkylated ethers, anionic bitail fluoro thio alkyls, alkyl aryl sulfonates, alkyl amine quaternary salts, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in publications such as U.S. Pat. Nos. 4,601,777; 4,251,824; 4,410,899; 4,412,224 and 4,532,530, the disclosures of each of which are totally incorporated herein by reference.

Ink jet inks are also known. For example, U.S. Pat. No. 4,508,570, the disclosure of which is totally incorporated herein by reference, discloses an aqueous ink for ink jet printing which comprises a water-soluble direct dye and/or acid dye, a polyhydric alcohol and/or an alkyl ether thereof, water, and at least one water-soluble non-ionic surface active agent selected from a specified polyoxyethylene alkyl amine, a specifed polyoxyethylene alkyl phenyl ether, and a specified polyoxyethylene alkyl ether. In addition, U.S. Pat. No. 4,623,689, the disclosure of which is totally incorporated herein by reference, discloses an ink jet ink containing aqueous colored polymers which comprise a homopolymer of an ethylenically unsaturated sulfonic acid or its salt or a copolymer of an ethylenically unsaturated sulfonic acid or its salt with another ethylenically unsaturated monomer, wherein the homopolymer or copolymer is dyed with a basic dye and has a lowest film-forming temperature of not higher than 35° C. Further, U.S. Pat. No. 4,627,875, the disclosure of which is totally incorporated herein by reference, discloses a recording liquid suitable for ink jet recording which comprises C.I. Acid Red 8 as the recording agent and a liquid medium comprising at least a member selected from polyethylene glycol, polyethylene glycol mono methylether, and a mixture thereof; a member selected from diethylene glycol, sulfolane, and a mixture thereof; a member selected from N-methyl-2-pyrrolidone, 1,3-dimethyl-2-imidazolidinone, and a mixture thereof; and water.

In addition, the use of surfactants in other applications is known. For example, U.S. Pat. No. 3,948,668 discloses a printing ink containing from about 0.01 percent to 1.0 percent by weight of a fluorocarbon surfactant containing a fluorocarbon moiety selected from $CF_3(CF_2)_3$, $CF_3CF(CF_3)O—$, and $CF_3CF(CF_3)CF_2—$, wherein the surfactant contains at least 25 percent fluorine by weight. In addition, U.S. Pat. No. 4,139,509 discloses a household starch composition prepared with a surface active agent, examples of which are provided in column 5, line 50 to column 7, line 21 and in column 9, line 58 to column 11, line 7.

Although the known ink jet ink compositions are suitable for their intended purposes, a need continues to exist for new and improved thermal ink jet inks. There is also a need for thermal ink jet inks that are non-toxic, non-carcinogenic, and non-mutagenic. In addition, a need exists for thermal ink jet inks with improved latency times, wherein latency is a measure of the amount of time for which the jet can be stopped and later started without clogging. Further, a need continues to exist for thermal ink jet inks with acceptable viscosity and surface tension values. A need also exists for thermal ink jet inks that do not contaminate or cause deterioration of the ink jet printer heater. In addition, there is a need for thermal ink jet inks with reduced drying times. A need also exists for thermal ink jet inks that exhibit reduced bleeding or feathering on specialty papers, plain papers, and transparencies. Further, there is a need for thermal ink jet inks that exhibit good lightfastness, waterfastness, and print density and that result in little or no formation of residual deposits on the printer heater. There is also a need for thermal ink jet inks that exhibit good mixing of primary colors to generate mottle-free images of the desired color, independent of the order in which the primary color inks are applied to the substrate. Mottle is observed when inks of two different colors are mixed to form an image of a secondary color and the inks become segregated by color as a result of their rejecting each other because of differences in surface tensions. Inks of the present invention can be employed to form mottle-free images of secondary colors, and color quality remains constant regardless of the order in which the colored inks are applied to the printing substrate.

SUMMARY OF THE INVENTION

It is an object of the present invention to provide improved thermal ink jet inks.

Another object of the present invention is to provide thermal ink jet inks that are non-toxic, non-carcinogenic, and non-mutagenic.

Yet another object of the present invention is to provide thermal ink jet inks that have improved latency times.

Still another object of the present invention is to provide thermal ink jet inks with acceptable viscosity and surface tension values.

It is another object of the present invention to provide thermal ink jet inks that do not contaminate or cause deterioration of the ink jet printer heater.

It is yet another object of the present invention to provide thermal ink jet inks with reduced drying times.

It is still another object of the present invention to provide thermal ink jet inks that exhibit reduced bleeding on specialty papers, plain papers, and transparencies.

Another object of the present invention is to provide thermal ink jet inks that exhibit good lightfastness, waterfastness, and print density and that result in little or no formation of residual deposits on the printer heater.

Yet another object of the present invention is to provide thermal ink jet inks that exhibit good mixing of primary colors to generate mottle-free images of the desired color, independent of the order in which the primary color inks are applied to the substrate.

These and other objects of the present invention are achieved by providing a thermal ink jet ink composition comprising a dye, a liquid medium, and a surfactant selected from the group consisting of polyoxyalkylated ethers, anionic bitail fluoro thio alkyls, alkyl aryl sulfonates, alkyl amine quaternary salts, and mixtures thereof. The present invention also includes a process for generating printed images with a thermal ink jet printer. This process comprises causing the ink compositions of the present invention to be ejected in imagewise fashion from a thermal ink jet printing apparatus onto a suitable substrate, such as plain paper, treated or coated paper, transparency material, and the like.

Inks of the present invention generally comprise a dye colorant. Generally, any effective dye, such as one of the direct dyes or the acid dyes, may be selected, provided that it is compatible with the other ink components and is soluble in the liquid medium. Examples of suitable dyes include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodagaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Severon Blue 5GMF (ICI); Basacid Blue 750 (BASF); and the like. Typical preferred dyes Bernacid Red, available from Berncolors, Poughkeepsie, N.Y., Pontamine Brilliant Bond Blue, Berncolor A. Y. 34, Basacid Black X34, Carta Black 2GT, Telon Fast Yellow 4GL-175, and the like. The dye is generally present in the ink composition in an effective amount, generally from about 0.5 to about 8 percent by weight, and preferably from about 1 to about 6 percent by weight.

The inks of the present invention also include a liquid medium. Frequently, water comprises the major portion of the liquid medium of the inks of the present invention, and, while it may comprise 100 percent of the liquid medium, is generally present in an amount of from about 7 to about 93 percent by weight of the ink, and preferably from about 55 to about 85 percent by weight of the ink. Preferably, the inks of the present invention also contain a humectant such as a glycol, including ethylene glycol, propylene glycol, other glycols, or other known humectants as part of the liquid medium. When present, the humectant is present in an effective amount, generally from about 5 to about 60 percent by weight, preferably from about 10 to about 20 percent by weight, and most preferably at about 17 percent by weight. Any other suitable liquid medium can also be employed provided that the objectives of the present invention are achieved. In addition, the ink jet inks of the present invention may contain an N-alkyl-pyrrolidone, such as N-methyl-2-pyrrolidone, in the liquid medium, present in an effective amount, generally from about 2 to about 20 percent by weight, preferably from about 4 to about 16 percent by weight, and most preferably at about 8 percent by weight. The surfactants are present in an effective amount, generally from about 0.1 to about 8 percent by weight of the ink, and preferably from about 0.2 to 6 percent by weight of the ink. Optionally, a biocide such as sorbic acid, 1-(3-chloroallyl)-3,5,7-triaza-1-azoniaadamantane chloride, commerically available as Dowicil 200 (Dow Chemical Company, Midland, Mich.), vinylene-bis thiocyanate, commercially available as Cytox 3711 (American Cyanamid Company, Wayne, N.J.), disodium ethylenebis-dithiocarbamate, commercially available as Dithone D14 (Rohm & Haas Company, Philadelphia, Pa.), bis(-trichloromethyl) sulfone, commercially available as Biocide N-1386 (Stauffer Chemical Company, Westport, Conn.), zinc pyridinethione, commerically available as zinc omadine (Olin Corporation Stamford, Conn.), 2-bromo-t-nitropropane-1,3-diol, commericially available as onyxide 500 (Onyx Chemical Company, Jersey City, N.J.), Bosquat MB50 (Louza, Inc., Fairtown, N.J.), and the like may be present in the inks of the present invention. When present, the biocide is in an effective amount, generally from about 0.01 to about 1 percent by weight, and preferably from about 0.1 to about 0.5 percent by weight. Other known additives or ink jet ink liquid media formulations, such as those disclosed in U.S. Pat. No. 4,627,875, the disclosure of which is totally incorporated herein by reference, may be employed for the inks of the present invention, provided that the ink does not contain any strongly cationic additives that precipitate the surfactants employed in the inks of the present invention.

The surfactants of the present invention are selected from the group consisting of polyoxyalkylated ethers, anionic bitail fluoro alkyls, alkyl aryl sulfonates, alkyl diamine quaternary salts, and mixtures thereof. Polyoxyalkylated ether surfactants include those of the formula

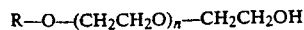

wherein R is a hydrocarbon, generally with little or no branching, and preferably with from about 8 to about 40 carbon atoms, such as octyl, nonyl, decyl, undecyl, dodecyl, tridecyl, tetradecyl, pentadecyl, hexadecyl, heptadecyl octadecyl, nonadecyl, eicosyl, and the like, and may also include aromatic functionalities, such as phenyl, naphthyl, biphenyl, and the like, and n represents the number of repeating segments, and preferably is a number ranging from 1 to about 100. A typical member of this class of surfactants is of the formula $H_{35}C_{18}O(CH_2CH_2O)_{20}H$, and is commercially available as Peregal 'O' from GAF Corporation, Wayne, N.J. Other members of this class of surfactants include ethoxylates of secondary alcohols having chain lengths of from about 11 to about 15 carbon atoms, such as those commercially available as the Tergitol® series from Union Carbide, Danbury, Conn. Also in this class of surfactants are the Emulphogene® series available from GAF, including polyoxyethylated tridecyl alcohols, polyethoxylated decyl alcohol, polyoxyethylated alkyl thioether, linear aliphatic ethoxylates, polyoxyethylated castor oil, polyoxyethylated coconut fatty acid, polyoxyethylated oleyl alcohol, and the like. Inks including polyoxalkylated ether surfactants exhibit reduced heater deposits, suppressed nozzle crusting, and better mixing of inks of different colors. Improved color mixing enables bidirectional printing, wherein the colors are laid down in a different order, depending on whether printing occurs from right to left or from left to right; with ideal color mixing, the print color will not be affected by the direction of printing. In addition, the presence of a surfactant of this class reduces surface tension without affecting viscosity, which permits uniform penetration of the inks into substrates and leads to improved color mixing. By varying the alkyl chain length of the R group, for example, between 9 and 40, surface tension, drop spread, and print density can readily be adjusted with this class of surfactants. Print density tends to decrease with increasing alkyl chain length. For example, when the chain length is 9 carbon atoms, print density is about 1.18 optical density units. At 15 to 30 carbon atoms, optical density is reduced to about 1.12, and at 40 carbon atoms, optical density is further reduced to about 1.08. Increasing chain length also tends to reduce spreading of the image. Inks containing polyoxyalkylated ether surfactants also exhibit reduced heater deposits and little or no slowing of drop speed over time. For example, in an ink composition comprising 40 percent by weight ethylene glycol, 4.5 percent by weight butyl carbitol, and 1.5 percent by weight Bernacid Red dye, drop speed will remain relatively constant for about 1,000,000 drops and subsequently will drop due to formation of deposits on the heater. An ink of the same composition to which has been added 0.5 percent by weight of Peregal 'O', however, will exhibit relatively constant drop speed for about 1,000,000 drops, after which drop speed will actually increase, probably due to the detergent or cleaning effect of the surfactant. Inks containing these surfactants, particularly the Peregal 'O', also mix well to yield mottle-free images of secondary colors.

Another class of surfactants employed for the inks of the present invention, anionic bitail fluoro thio alkyl surfactants, are characterized in that they are thought to form a bilayer structure, for instance at air-liquid interfaces. Bilayer structures are believed to be formed when the surfactant material orients itself in two layers so that one end of the molecule is oriented inwardly and the other end of the molecule is oriented outwardly as shown below, wherein, for example, A represents the hydrophobic end of a surfactant molecule and B represents the hydrophilic end of the molecule:

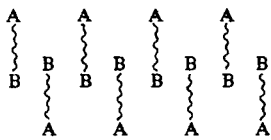

A typical member of this class of surfactants is of the formula:

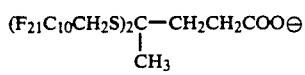

and is commercially available as Lodyne P200 from Ciba-Geigy, Ardsley, N.Y. Inks including this type of surfactant exhibit an approximately five-fold or more increase in latency as compared to inks not containing the surfactant. For example, an ink composition comprising 58 percent by weight of water, 40 percent by weight of ethylene glycol, 1.5 percent by weight of Bernacid Red dye, and 0.5 percent by weight of Lodyne P200 exhibits a latency time of over 1000 seconds under 10 percent relative humidity conditions. Under the same conditions, an ink of the same formulation but containing no Lodyne P200 exhibits a latency time of about 150 seconds. Inks containing this type of surfactant also exhibit suppressed nozzle creepage, which occurs when the ink seeps from the nozzle during nonprinting intervals, enhanced waterfastness of over 80 percent, and enhanced image edge sharpness on plain paper.

A third class of surfactants employed in the inks of the present invention, alkyl aryl sulfonate surfactants, are of the general formula

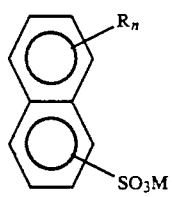

wherein R is an alkyl group, preferably with from about 3 to about 12 carbon atoms, or an aryl group, such as propyl, butyl, pentyl, hexyl, heptyl, octyl, nonyl, decyl, undecyl, or dodecyl, phenyl, naphthyl, and the like, preferably being isopropyl, n-butyl, or lauryl, and more preferably with either 3 or 4 carbon atoms, n is 1 or 2, and M is a monovalent metal, generally an alkali metal such as sodium. A typical member of this class of surfactants is of the formula:

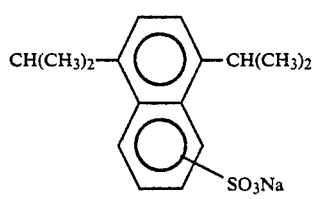

and is commercially available as Nekal BA77 from GAF, Wayne, N.J. Other examples of this class of surfactants are of the formulas

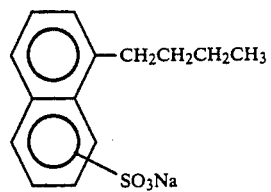

and

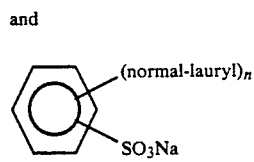

where n is 1 or 2. Inks including a surfactant of this class exhibit rapid penetration into paper and rapid drying times on plain paper and transparency materials. These surfactants also enable inks to wet transparency stock very effectively, which prevents beading and provides high quality transparency copies. In addition, surfactants of this class are exceptional dispersing agents, and can increase the solubility of otherwise insoluble dyes such as Telon Fast Yellow 4GL/175 (Mobay Corporation, Union, N.J.), thereby enabling their use as ink jet ink dyes.

Alkyl amine quaternary salt surfactants are of the general formula

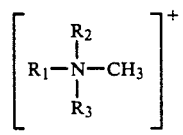

wherein $R_1$ is a long chain alkyl group with from about 8 to about 30 carbon atoms, such as octyl, nonyl, decyl, undecyl, dodecyl, tridecyl, tetradecyl, pentadecyl, hexadecyl, heptadecyl octadecyl, nonadecyl, eicosyl, and the like, and $R_2$ and $R_3$ are either lower alkyl groups with from 1 to about 4 carbon atoms or are polar groups such as alkoxy chains, including ethoxy chains. Typical members of this class of surfactants are of the formula

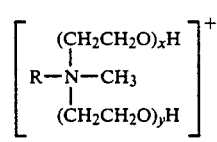

wherein R is a long chain alkyl group with from 12 to 20 carbon atoms and $x+y=$ from 2 to 15. This class of surfactants also includes alkyl diamine quaternary salts, which contain two positively charged nitrogen atoms and are generally of the formula

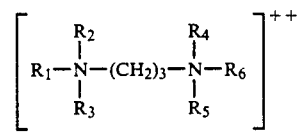

wherein $R_2$, $R_3$, $R_4$, and $R_5$ are either lower alkyl groups with from 1 to about 4 carbon atoms or are polar groups such as alkoxy groups, including ethoxy chains, $R_1$ is a long chain alkyl group with from about 8 to about 30 carbon atoms, and $R_6$ is either a lower alkyl group with from 1 to about 4 carbon atoms, a polar group such as an alkoxy group, including ethoxy chains, or a long chain alkyl group with from about 8 to about 30 carbon atoms. A typical alkyl diamine quaternary salt surfactant is of the formula:

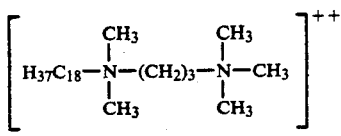

and is commercially available as Duoquat T50 from Akzo Chemie, Chicago, Ill. Inks including a surfactant of this class exhibit enhanced waterfastness of over 80 percent, reduced feathering, and migration resistance. Members of this class of surfactants tend to result in inks with relatively high surface tensions of about 40 to 43 dynes per centimeter. In many instances, the alkyl amine quaternary salt selected as the surfactant is preferably a single charged salt, wherein only one quaternary ammonium site is present, because dicharged quaternary ammonium salts containing two quaternary ammonium sites often tend to precipitate anionic dyes commonly used in ink jet inks. For example, when Pontamine Brilliant Bond Blue A or Basacid Black X-34 (BASF) dyes are present in the ink, an appropriate alkyl amine quaternary salt surfactant would be Ethoquad C/12, a single charged quaternary ammonium salt of the formula

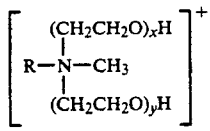

wherein R is a long chain alkyl group with 12 carbon atoms and $x+y=2$, available from Akzo Chemie, Chicago, Ill.

Mixtures of the above surfactants may be included in the ink compositions of the present invention. Generally, each of the surfactants in the mixture is present in an amount of from about 0.5 to about 5.0 percent by weight of the ink. By combining surfactants, the advantages imparted by each surfactant may be observed in a single ink. For example, Duoquat T50, a dicharged alkyl amine quaternary salt surfactant, will precipitate a dye such as Bernacid Red 2BMN. When the Duoquat T50 is accompanied, however, by Nekal BA77, an alkyl aryl sulfonate surfactant, the precipitated dye is resolubilized. A typical formulation containing a mixture of surfactants comprises a liquid medium containing 17 percent by weight ethylene glycol, 8 percent by weight N-methyl-2-pyrrolidone, and 75 percent by weight water, to which is added 2 percent by weight Bernacid Red 2BMN dye, 2 percent by weight Duoquat T50, 2 percent by weight Nekal BA77, and 0.5 percent by weight Lodyne P200 (an anionic bitail fluoro alkyl surfactant). This ink formulation exhibits a waterfastness of about 80 percent on silica paper and plain paper. Inks containing mixtures of an anionic bitail fluoro thio alkyl surfactant such as Lodyne P200 and an alkyl aryl sulfonate surfactant such as Nekal BA77 tend to exhibit reduced feathering, particularly on plain papers, such as Xerox ® 4024. Inks containing mixtures of an anionic bitail fluoro thio alkyl surfactant such as Lodyne P200 and ethoxylated surfactants tend to exhibit crust free operation.

Ink compositions of the present invention can be prepared by various methods, including simple mixing of the ingredients under ambient conditions and in the relative amounts desired in the ink.

Inks of the present invention exhibit characteristics that make them highly desirable for thermal ink jet printing. For example, the surface tension of inks of the present invention generally ranges from about 30 to about 65 dynes per centimeter, and preferably is as high as possible, preferably being from about 40 to about 65 dynes per centimeter and more preferably about 65 dynes per centimeter. Viscosity generally ranges from about 1.0 to about 5.0 centipoise and preferably is as low as possible, preferably ranging from 1 to 2 centipoise. Latency, which is the period during which the ink jet may be stopped while it contains the ink and subsequently restarted without clogging of the nozzle, is generally above 100 seconds, and may extend beyond 1000 seconds. Latency in general should be as high as possible, and at least 50 seconds, to enable restarting of the ink jet printer after extended idle periods. Inks of the present invention that are of different colors can blend well with each other without undergoing any interaction. In addition, inks of the present invention do not contaminate or deteriorate the heater of an ink jet printer, and little or no corrosion or deposits are found on heaters wherein these inks are used, even after over $1 \times 10^6$ drops have been ejected. Prints made with the inks of the present invention generally exhibit waterfastness values of from about 40 percent to over 80 percent, and exhibit image edge sharpness and reduced feathering on plain paper as well as treated or coated papers and transparencies.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A cyan thermal ink jet ink composition was prepared with a liquid medium comprising about 40 percent by weight of ethylene glycol and about 60 percent by weight of water, to which was added Peregal 'O', a polyoxyethylated ether surfactant available from GAF Corporation, in an amount of 0.5 percent by weight of the liquid medium, sorbic acid in an amount of 0.1 percent by weight of the liquid medium, and Pontamine Brilliant Bond Blue dye in an amount of 5.0 percent by weight of the liquid medium. The ingredients were combined by simple mixing at ambient temperature (about 25° C.) followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of less than 40 seconds, exhibited a small degree of bleeding and feathering, and mixed especially well with other inks of the same composition but with different colored dyes (Bernacid Red 2BMN and Berncolor A. Y. 34) to form mottle-free images whose color characteristics were independent of the order in which the individual primary colors were deposited.

EXAMPLE II

A magenta thermal ink jet ink composition was prepared with a liquid medium comprising about 40 percent by weight of ethylene glycol and about 60 percent by weight of water, to which was added Peregal 'O', a polyoxyethylated ether surfactant available from GAF Corporation, in an amount of 0.5 percent by weight of the liquid medium, sorbic acid in an amount of 0.1 percent by weight of the liquid medium, and Bernacid Red 2BMN dye in an amount of 2.0 percent by weight of the liquid medium. The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of about 50 seconds, exhibited a small degree of bleeding and feathering, and mixed especially well with other inks of the same composition but with different colored dyes (Pontamine Brilliant Bond Blue and Berncolor A. Y. 34) to form mottle-free images whose color characteristics were independent of the order in which the individual primary colors were deposited. In addition, only negligible heater deposits were observed in the printer after $2 \times 10^7$ drops had been jetted, drop formation characteristics showed virtually no change after this time, and drop velocity increased during this time, indicating that heater deposits and clogging of the jets was minimal. In addition, it was observed that nozzle creepage and overnight crusting were significantly suppressed with this ink as compared to an ink of the same formulation except that it contained no Peregal 'O'.

EXAMPLE III

A yellow thermal ink jet ink composition was prepared with a liquid medium comprising about 40 percent by weight of ethylene glycol and about 60 percent by weight of water, to which was added Peregal 'O', a polyoxyethylated ether surfactant available from GAF Corporation, in an amount of 0.5 percent by weight of the liquid medium, sorbic acid in an amount of 0.1 percent by weight of the liquid medium, and Berncolor A. Y. 34 dye in an amount of 5.0 percent by weight of the liquid medium. The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of about 30 seconds, exhibited a small degree of bleeding and feathering, and mixed especially well with other inks of the same composition but with different colored dyes (Pontamine Brilliant Bond Blue and Bernacid Red 2BMN) to form mottle-free images whose color characteristics were independent of the order in which the individual primary colors were deposited.

EXAMPLE IV

A black thermal ink jet ink composition was prepared with a liquid medium comprising about 40 percent by weight of ethylene glycol and about 60 percent by weight of water, to which was added Peregal 'O', a polyoxyethylated ether surfactant available from GAF Corporation, in an amount of 0.5 percent by weight of the liquid medium, sorbic acid in an amount of 0.1 percent by weight of the liquid medium, and Basacid Black X34 dye in an amount of 3.75 percent by weight of the liquid medium. The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of about 20 to 50 seconds, and exhibited a small degree of bleeding and feathering.

EXAMPLE V

A magenta thermal ink jet ink composition was prepared with a liquid medium comprising about 17 percent by weight of ethylene glycol, about 8 percent by weight of N-methylpyrrolidone, and about 75 percent by weight of water, to which was added 2.25 percent by weight Bernacid Red 2BMN dye and 0.5 percent by weight of Tergitol ® 15-S-20 (ethoxylated alcohol available from Union Carbide, Danbury, Conn.). The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited characteristics similar to those observed for the inks of Examples I through IV, except that greater drop spread was observed, resulting in greater uniformity of solid area density images, along with somewhat greater feathering.

EXAMPLE VI

A magenta thermal ink jet ink composition was prepared with a liquid medium comprising about 40 percent by weight of ethylene glycol and about 60 percent by weight of water, to which was added Lodyne P200 in an amount of 0.5 percent by weight of the liquid medium, sorbic acid in an amount of 0.1 percent by weight of the liquid medium, and Bernacid Red 2BMN dye in an amount of 2.0 percent by weight of the liquid medium. The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of about 50 seconds, exhibited good bleeding and feathering behavior, and mixed especially well with other inks of the same composition but with different colored dyes (Pontamine Brilliant Bond Blue and Berncolor A. Y. 34) to form mottle-free images whose color characteristics were independent of the order in which the individual primary colors were deposited. In addition, only negligible heater deposits were observed in the printer after $2 \times 10^7$ drops had been jetted, drop formation characteristics showed virtually no change after this time, and drop velocity increased during this time. In addition, it was observed that nozzle creepage and overnight crusting were significantly suppressed with this ink. Further, this ink exhibited a latency of over 1,000 seconds, as compared to a latency of 200 seconds observed for a similar ink composition containing Peregal 'O' instead of Lodyne P200.

EXAMPLE VII

A magenta thermal ink jet ink composition was prepared with a liquid medium comprising about 17 percent by weight of ethylene glycol, about 8 percent by weight of N-methyl pyrrolidone and about 75 percent by weight of water, to which was added Lodyne P200 in an amount of 0.5 percent by weight of the liquid medium, Nekal BA77 in an amount of 0.5 percent by weight of the liquid medium, and Bernacid Red 2BMN dye in an amount of 2.0 percent by weight of the liquid medium. The ingredients were combined by simple mixing at ambient temperatures followed by filtration. Images were then formed on Xerox ® 4020 transparency material and on Xerox ® 4024 plain paper by incorporating the ink into a test fixture comprising a Diablo ® piezoelectric printer modified to equip it with a thermal ink jet printhead test fixture. The images formed exhibited an excellent drying time of about 25 seconds on plain paper and less than 10 seconds on transparency material, an approximately five-fold improvement over an ink of similar composition but containing no Nekal BA77 and Lodyne P200. In addition, the images formed exhibited a marked reduction in bleeding and feathering as compared to an ink of similar composition but containing no Nekal BA77 and Lodyne P200.

EXAMPLE VIII

A yellow thermal ink jet ink composition was prepared with a liquid medium comprising about 40 percent by weight of ethylene glycol and about 60 percent by weight of water, to which was added Nekal BA77 in an amount of 2 percent by weight of the liquid medium, Lodyne P200 in an amount of 2 percent by weight of the liquid medium, Duoquad T50 (Akzo Chemie) in an amount of 2 percent by weight of the liquid medium, and Berncolor A. Y. 34 dye in an amount of 5.0 percent by weight of the liquid medium. The ingredients were combined by simple mixing at ambient temperatures followed by filtration. Images were then formed on Diablo ® silica coated paper and on Xerox ® 4024 plain paper by hand coating the ink onto the substrates with a Gardner rod. The images formed exhibited a waterfastness of about 60 percent after being immersed in water for 10 minutes, as compared to a waterfastness of 0 percent for images formed with an ink of similar composition but containing no Nekal BA77, Lodyne P200, and Duoquad T50.

EXAMPLE IX

A black thermal ink jet ink composition was prepared with a liquid medium comprising about 17 percent by weight of ethylene glycol, about 8 percent by weight of N-methylpyrrolidone, and about 75 percent by weight of water, to which was added Nekal BA77 in an amount of 3 percent by weight of the liquid medium, Lodyne P200 in an amount of 2 percent by weight of the liquid medium, Ethoquad C/12 (Akzo Chemie) in an amount of 1 percent by weight of the liquid medium, and Basacid Black X34 dye in an amount of 3.75 percent by weight of the liquid medium. The ingredients were combined by simple mixing at ambient temperatures followed by filtration. Images were then formed on Diablo ® silica coated paper, on Xerox ® 4020 transparency material, and on Xerox ® 4024 plain paper by hand coating the ink onto the substrates with a Gardner rod. The images formed exhibited an excellent drying time of about 10 seconds on transparency material, an approximately five-fold improvement over the drying time of an ink of similar composition but containing no Nekal BA77, Lodyne P200, and Ethoquad C/12. In addition, the images exhibited a waterfastness of about 70 percent after being immersed in water for 10 minutes, as compared to a waterfastness of about 30 percent for an ink of similar composition but containing Peregal 'O' as the surfactant. The images formed also exhibited a marked reduction in bleeding and feathering.

EXAMPLE X

A cyan thermal ink jet ink composition was prepared with a liquid medium comprising about 17 percent by weight of ethylene glycol, about 8 percent by weight of N-methylpyrrolidone, and about 75 percent by weight of water, to which was added 5.0 percent by weight Pontamine Brilliant Bond Blue A dye, 1 percent by weight of Ethoquad C/12 (available from Akzo Chemie, Chicago, Ill.), 3 percent by weight of Nekal BA77 (available from GAF, Wayne, N.J.), and 2 percent by weight of Lodyne P200 (available from Ciba-Geigy). The ingredients were combined by simple mixing at ambient temperatures followed by filtration. Images were then formed on Diablo ® silica coated paper, on Xerox ® 4020 transparency material, and on Xerox ® 4024 plain paper by hand coating the ink onto the substrates with a Gardner rod. The images thus formed comprised a smooth, uniform deposit formed without spreading or puddling. Drying time for the ink was about 10 seconds on the plain paper and about 20 seconds on the transparency material. The images formed exhibited a waterfastness of about 50 percent after being soaked in water for 10 minutes, as compared to a waterfastness of 0 for an ink of similar composition but containing no Ethoquad C/12, Nekal BA77, and Lodyne P200.

EXAMPLE XI

A magenta thermal ink jet ink composition was prepared with a liquid medium comprising about 17 percent by weight of ethylene glycol, about 8 percent by weight of N-methylpyrrolidone, and about 75 percent by weight of water, to which was added 2.25 percent by weight Bernacid Red 2BMN dye, 2 percent by weight of Duoquad T50, 2 percent by weight of Nekal BA77, and 2 percent by weight of Lodyne P200. The ingredients were combined by simple mixing at ambient temperatures followed by filtration. Images were then formed on Diablo ® silica coated paper, on Xerox ® 4020 transparency material, and on Xerox ® 4024 plain paper by hand coating the ink onto the substrates with a Gardner rod. The images thus formed exhibited a waterfastness of about 80 percent on the silica coated paper and about 50 percent on the plain paper after being soaked in water for 10 minutes, as compared to a waterfastness of 0 percent for an ink of similar composition but containing no Ethoquad C/12, Nekal BA77, and Lodyne P200. The image on the transparency material dried within 10 seconds to yield a smooth, well wetting deposit. The transparency bearing the image was placed in an atmosphere of 100 percent relative humidity for 16 hours, after which no detectable blooming or ink spreading had occurred. An image on transparency material formed with an ink of similar composition but containing no Ethoquad C/12, Nekal BA77, and Lodyne P200 underwent readily observable spreading in an atmosphere of 100 percent relative humidity after 16 hours.

EXAMPLE XII

A black thermal ink jet ink composition was prepared with a liquid medium comprising about 17 percent by weight of ethylene glycol, about 8 percent by weight of N-methylpyrrolidone, and about 75 percent by weight of water, to which was added 5.0 percent by weight Carta Black 2GT (Sandoz, Greensboro, N.C.) dye, 2 percent by weight of Duoquad T50 (available from Akzo Chemie, Chicago, Ill), 3 percent by weight of Nekal BA77 (available from GAF), and 2 percent by weight of Lodyne P200 (available from Ciba-Geigy). The ingredients were combined by simple mixing at ambient temperatures followed by filtration. Images were then formed on Diablo ® silica coated paper and on Xerox ® 4024 plain paper by hand coating the ink onto the substrates with a Gardner rod. The images thus formed exhibited a waterfastness of over 90 percent on the silica coated paper and of about 50 percent on the plain paper.

EXAMPLE XIII

A yellow thermal ink jet ink composition was prepared with a liquid medium comprising about 40 percent by weight of ethylene glycol and about 60 percent by weight of water, to which was added Nekal BA77 in an amount of 2 percent by weight of the liquid medium, Lodyne P200 in an amount of 2 percent by weight of the liquid medium, and Telon Fast Yellow 4GL-175 (Mobay Chemical Company, Union, N.J.) dye in an amount of 4.0 percent by weight of the liquid medium. The ingredients were combined by simple mixing at ambient temperatures followed by filtration. Images were then formed on Diablo ® silica coated paper and on Xerox ® 4024 plain paper by incorporating the ink into a test fixture comprising a Diablo ® piezoelectric printer modified to equip it with a thermal ink jet printhead test fixture. The images formed exhibited an excellent drying time of about 10 seconds, and exhibited a waterfastness of over 90 percent on both papers after soaking in water for 10 minutes. Stable, uniform jetting of the ink was observed.

A similar ink was prepared except that it contained no Nekal BA77 and Lodyne P200, and images were formed by the same procedure on silica coated paper and plain paper. Jetting of the ink was very erratic, and was followed by apparent jet clogging, presumably due to limited solubility of the dye in the ink vehicle.

Other embodiments and modifications of the present invention may occur to those skilled in the art subsequent to a review of the information presented herein; these embodiments and modifications, as well as equivalents thereof, are also included within the scope of this invention.

What is claimed is:

1. A thermal ink jet printing composition comprising a dye, a liquid medium containing water, and a surfactant selected from the group consisting of polyoxyethylated ethers of the formula R—O—(CH$_2$CH$_2$O)$_n$—CH$_2$CH$_2$OH wherein R is an aliphatic hydrocarbon chain of from about 8 to about 40 carbon atoms and n is a number of from 1 to about 100, anionic bitail fluoro thio alkyls of the formula

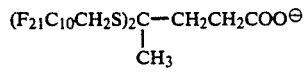

alkyl aryl sulfonates, alkyl amine quaternary salts, and mixtures thereof.

2. A thermal ink jet printing composition according to claim 1 wherein the surfactant comprises a polyoxyethylated ether.

3. A thermal ink jet printing composition according to claim 1 wherein the surfactant comprises an alkyl aryl sulfonate.

4. A thermal ink jet printing composition according to claim 1 wherein the surfactant comprises an alkyl amine quaternary salt.

5. A thermal ink jet printing composition according to claim 1 wherein the surfactant comprises a mixture of a polyoxyethylated ether and an anionic bitail fluoro thio alkyl.

6. A thermal ink jet printing composition according to claim 1 wherein the surfactant comprises a mixture of an anionic bitail fluoro thio alkyl and an alkyl aryl sulfonate.

7. A thermal ink jet printing composition according to claim 1 wherein the surfactant comprises a mixture of an anionic bitail fluoro thio alkyl, an alkyl amine quaternary salt, and an alkyl aryl sulfonate.

8. A thermal ink jet printing composition according to claim 1 wherein the liquid medium also contains a glycol.

9. A thermal ink jet printing composition according to claim 1 wherein the dye is selected from the group consisting of direct dyes and acid dyes.

10. A thermal ink jet printing composition according to claim 1 wherein the dye is present in an amount of from about 0.5 to about 8 percent by weight, the surfactant is present in an amount of from about 0.1 to about 4 percent by weight, water is present in an amount of from about 7 to about 93 percent by weight, ethylene glycol is present in an amount of from about 5 to about 60 percent by weight, N-methyl-2-pyrrolidone is present in an amount of from about 2 to about 20 percent by weight, and a biocide is present in an amount of from about 0.01 to about 1 percent by weight.

11. A thermal ink jet printing composition according to claim 10 wherein the surfactant is a polyoxyethylated ether.

12. A thermal ink jet printing composition according to claim 11 wherein the surfactant is of the formula H$_{35}$C$_{18}$O(CH$_2$CH$_2$O)$_{20}$H.

13. A thermal ink jet printing composition according to claim 10 wherein the dye is present in an amount of from about 1 to about 6 percent by weight, the ethylene glycol is present in an amount of from about 10 to about 20 percent by weight, the N-methyl-2-pyrrolidone is present in an amount of from about 4 to about 16 percent by weight, the surfactant is present in an amount of from about 0.2 to about 2 percent by weight, the biocide is present in an amount of from about 0.1 to about 0.5 percent by weight, and the water is present in an amount of from about 55.5 to about 85 percent by weight.

14. A thermal ink jet printing composition according to claim 13 wherein the surfactant is a polyoxyethylated ether.

15. A thermal ink jet printing composition according to claim 14 wherein the surfactant is of the formula $H_{35}C_{18}O(CH_2CH_2O)_{20}H$.

16. A thermal ink jet printing composition according to claim 1 wherein the surfactant is selected from the group consisting of ethoxylates of secondary alcohols, polyoxyethylated tridecyl alcohols, polyethoxylated decyl alcohol, polyoxyethylated alkyl thioether, linear aliphatic ethoxylates, polyoxyethylated castor oil, polyoxyethylated coconut fatty acid, and polyoxyethylated oleyl alcohol.

17. A thermal ink jet ink composition according to claim 1 wherein the surfactant is of the formula $H_{35}C_{18}O(CH_2CH_2O)_{20}H$.

18. A thermal ink jet ink composition according to claim 1 wherein the surfactant is of the formula

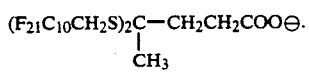

19. A thermal ink jet ink composition according to claim 1 wherein the surfactant is of the formula

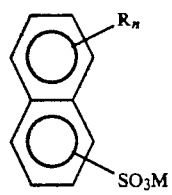

wherein R is selected from the group consisting of alkyl groups with from about 3 to about 12 carbon atoms and aryl groups with from about 6 to about 12 carbon atoms, n is 1 or 2, and M is a monovalent metal.

20. A thermal ink jet ink composition according to claim 19 wherein the surfactant is of the formula

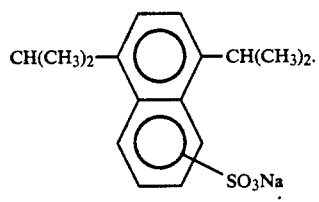

21. A thermal ink jet ink composition according to claim 23 wherein the surfactant is of the formula

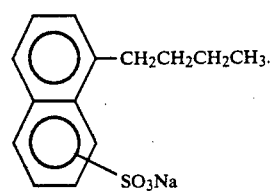

22. A thermal ink jet ink composition according to claim 19 wherein the surfactant is of the formula

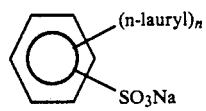

where n is 1 or 2.

23. A thermal ink jet ink composition according to claim 1 wherein the surfactant is of the formula

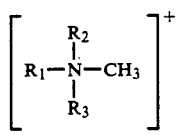

wherein $R_1$ is an alkyl group with from about 8 to about 30 carbon atoms and $R_2$ and $R_3$ are selected from the group consisting of alkyl groups with from 1 to about 4 carbon atoms and ethoxy groups.

24. A thermal ink jet ink composition according to claim 23 wherein the surfactant is of the formula

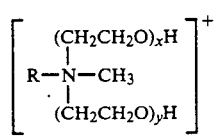

wherein R is an alkyl group with from 12 to 20 carbon atoms and $x+y=$ from 2 to 15.

25. A thermal ink jet ink composition according to claim 23 wherein the surfactant is of the formula

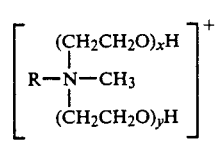

wherein R is an alkyl group with 12 carbon atoms and $x+y=2$.

26. A thermal ink jet ink composition according to claim 1 wherein the surfactant is of the formula

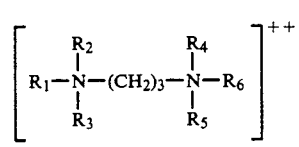

wherein $R_2$, $R_3$, $R_4$, and $R_5$ are selected from the group consisting of alkyl groups with from 1 to about 4 carbon atoms and ethoxy chains, $R_1$ is an alkyl group with from about 8 to about 30 carbon atoms, and $R_6$ is selected from the group consisting of alkyl groups with from 1 to about 4 carbon atoms, ethoxy chains, and alkyl groups with from about 8 to about 30 carbon atoms.

27. A thermal ink jet ink composition according to claim 26 wherein the surfactant is of the formula

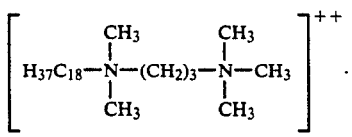

28. A thermal ink jet ink composition according to claim 1 wherein the surfactant is a mixture of a compound of the formula

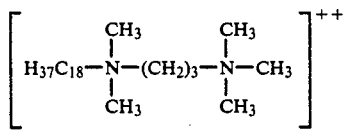

and a compound of the formula

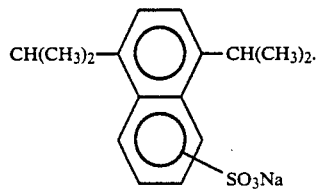

29. A thermal ink jet ink composition according to claim 1 wherein the surfactant is a mixture of a compound of the formula

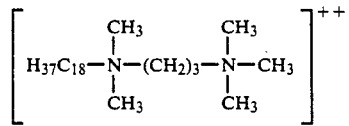

a compound of the formula

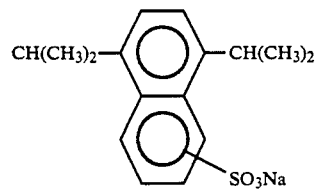

and a compound of the formula

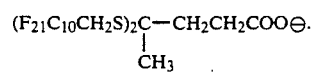

30. A thermal ink jet ink composition according to claim 1 wherein the surfactant is a mixture of a compound of the formula

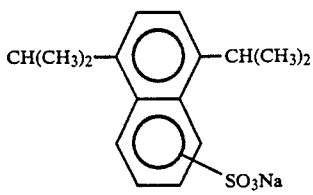

and a compound of the formula

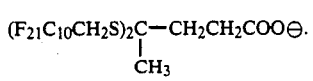

31. A thermal ink jet ink composition according to claim 1 wherein the surfactant is a mixture of a compound of the formula

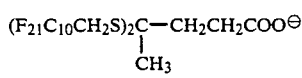

and a compound of the formula $H_{35}C_{18}O(CH_2CH_2O)_{20}H$.

32. A thermal ink jet ink composition according to claim 1 wherein the surfactant is a mixture of a compound of the formula

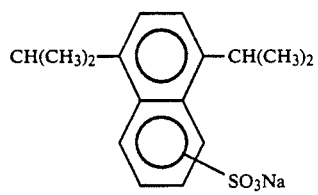

a compound of the formula

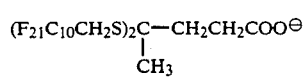

and a compound of the formula

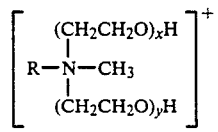

wherein R is an alkyl group with 12 carbon atoms and $x+y=2$.

33. A thermal ink jet ink composition according to claim 1 wherein the liquid medium comprises about 40 percent by weight of ehtylene glycol and about 60 percent by weight of water, the dye comprises Telon Fast Yellow 4GL-175, and the surfactant is a mixture of a compound of the formula

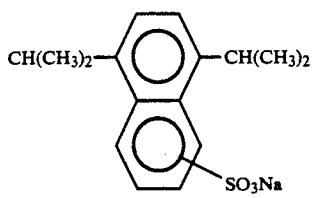

and a compound of the formula

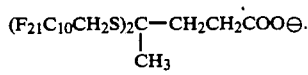

34. A process for generating images which comprises causing the ink composition of claim 1 to be ejected in imagewise fashion from a thermal ink jet printer onto a substrate.

35. A process according to claim 34 wherein the surfactant comprises a polyoxyethylated ether.

36. A process according to claim 34 wherein the surfactant comprises an anionic bitail fluoro thio alkyl.

37. A process according to claim 34 wherein the surfactant comprises an alkyl aryl sulfonate.

38. A process according to claim 34 wherein the surfactant comprises an alkyl amine quaternary salt.

39. A process according to claim 34 wherein the surfactant comprises a mixture of a polyoxyethylated ether and an anionic bitail fluoro thio alkyl.

40. A process according to claim 34 wherein the surfactant comprises a mixture of an anionic bitail fluoro thio alkyl and an alkyl aryl sulfonate.

41. A process according to claim 34 wherein the surfactant comprises a mixture of an anionic bitail fluoro thio alkyl, an alkyl amine quaternary salt, and an alkyl aryl sulfonate.

42. A thermal ink jet printing composition according to claim 1 wherein the dye is present in an amount of from about 0.5 to about 8 percent by weight, the liquid medium is present in an amount of from about 7 to about 93 percent by weight, and the surfactant is present in an amount of from about 0.1 to about 8 percent by weight.

43. A process according to claim 34 wherein the dye is present in an amount of from about 0.5 to about 8 percent by weight, the liquid medium is present in an amount of from about 7 to about 93 percent by weight, and the surfactant is present in an amount of from about 0.1 to about 8 percent by weight.

44. A thermal ink jet printing composition comprising a dye, a liquid medium, and a surfactant which comprises a mixture of a polyoxyethylated ether and an anionic bitail fluoro thio alkyl.

45. A thermal ink jet printing composition comprising a dye, a liquid medium, and a surfactant which comprises a mixture of an anionic bitail fluoro thio alkyl and an alkyl aryl sulfonate.

46. A thermal ink jet printing composition comprising a dye, a liquid medium, and a surfactant which comprises a mixture of an anionic bitail fluoro thio alkyl, an alkyl amine quaternary salt, and an alkyl aryl sulfonate.

47. A process for generating images which comprises causing an ink composition comprising a dye, a liquid medium, and a surfactant which comprises a mixture of a polyoxyethylated ether and an anionic bitail fluoro thio alkyl to be ejected in imagewise fashion from a thermal ink jet printer onto a substrate.

48. A process for generating images which comprises causing an ink composition comprising a dye, a liquid medium, and a surfactant which comprises a mixture of an anionic bitail fluoro thio alkyl and an alkyl aryl sulfonate to be ejected in imagewise fashion from a thermal ink jet printer onto a substrate.

49. A process for generating images which comprises causing an ink composition comprising a dye, a liquid medium, and a surfactant which comprises a mixture of an anionic bitail fluoro thio alkyl, an alkyl amine quaternary salt, and an alkyl aryl sulfonate to be ejected in imagewise fashion from a thermal ink jet printer onto a substrate.

50. A process for generating images which comprises causing an ink composition comprising a dye, a liquid medium, and a surfactant which comprises an anionic bitail fluoro thio alkyl to be ejected in imagewise fashion from a thermal ink jet printer onto a substrate.

51. A thermal ink jet printing composition according to claim 1 wherein the ink has a viscosity of 5 centipoise or less.

52. A process according to claim 34 wherein the ink has a viscosity of 5 centipoise or less.

* * * * *